(12) United States Patent
Hacke

(10) Patent No.: US 7,018,702 B2
(45) Date of Patent: Mar. 28, 2006

(54) COMPONENT

(75) Inventor: Frank Hacke, Steisslingen (DE)

(73) Assignee: TRW Automotive Electronics & Components GmbH & Co. KG, Radolfzell (DE)

( * ) Notice: Subject to any disclaimer, the term of this patent is extended or adjusted under 35 U.S.C. 154(b) by 0 days.

(21) Appl. No.: 09/796,015

(22) Filed: Feb. 28, 2001

(65) Prior Publication Data

US 2001/0018102 A1 Aug. 30, 2001

(30) Foreign Application Priority Data

Feb. 29, 2000 (DE) .......................... 200 03 679 U

(51) Int. Cl.
  *B32B 23/02* (2006.01)
  *B32B 7/08* (2006.01)
  *H01H 1/52* (2006.01)

(52) U.S. Cl. ...................... 428/192; 428/142; 428/144; 428/223; 428/332; 200/318; 200/237; 296/146.7

(58) Field of Classification Search ................ 428/192, 428/332, 357, 34.6, 142, 144, 223; 200/318, 200/237, 344; 296/146.7, 1.08
See application file for complete search history.

(56) References Cited

U.S. PATENT DOCUMENTS

| | | | | |
|---|---|---|---|---|
| 2,440,943 A | | 5/1948 | Gonsett et al. | |
| 3,617,349 A | * | 11/1971 | Prasse | ........................ 117/71 |
| 3,851,920 A | * | 12/1974 | Harris et al. | ........... 297/452.55 |
| 3,928,742 A | | 12/1975 | Rule | |
| 5,351,342 A | * | 10/1994 | Garneau | ........................ 2/414 |
| 5,815,057 A | * | 9/1998 | Hoffman et al. | ................ 335/4 |
| 5,824,982 A | | 10/1998 | Kress | |

FOREIGN PATENT DOCUMENTS

| | | |
|---|---|---|
| DE | 9104086 | 8/1991 |
| DE | 19715536 | 10/1998 |
| EP | 0287040 | 10/1988 |

* cited by examiner

*Primary Examiner*—Rena Dye
*Assistant Examiner*—Lawrence Ferguson
(74) *Attorney, Agent, or Firm*—Tarolli, Sundheim, Covell & Tummino L.L.P.

(57) ABSTRACT

A component including a base body of a relatively hard material and a coating of a relatively soft material, wherein the coating covers at least a main surface area of the base body. The main surface area is delimited by an outer periphery and an edge portion of the coating extends from the periphery and comprises a reinforcement made of a relatively hard material and engages the base body.

10 Claims, 1 Drawing Sheet

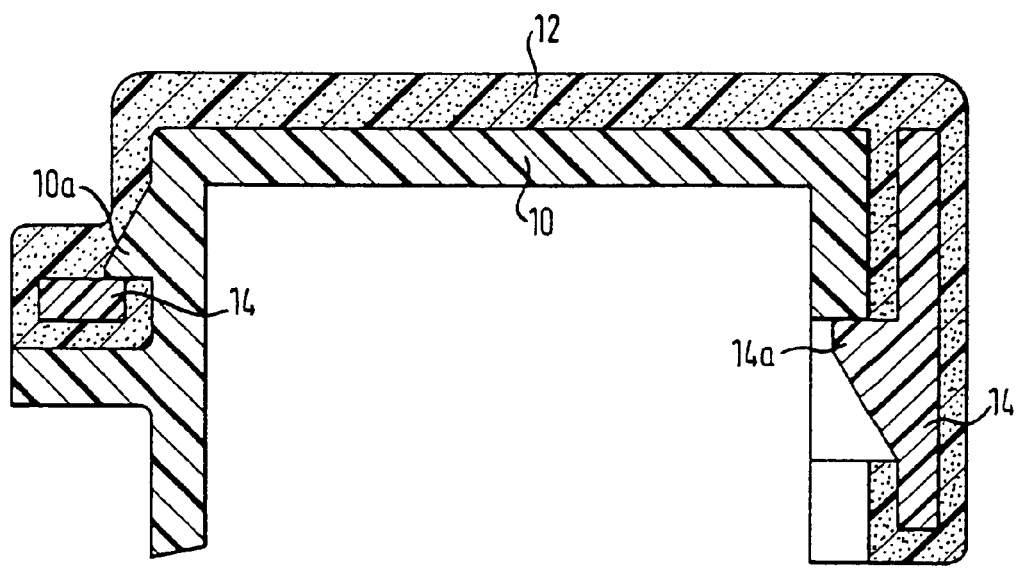

COMPONENT

FIELD OF INVENTION

The invention relates to a component including a base body of a relatively hard material and a coating of a relatively soft material.

BACKGROUND OF THE INVENTION

Components such as vehicular trim elements, control elements and keys for actuating electric switches are often coated with a pleasing tactile material, more particularly rubber-like material. If it is not possible, or not wanted, to produce an intimate connection between the base body of the component, consisting of a relatively hard material, more particularly plastics, and the material of the coating, then the coating needs to be secured to the base body mechanically. For this purpose base body and coating may be designed to positively interlock. Despite this, however, the coating may become detached or distorted.

BRIEF SUMMARY OF THE INVENTION

The invention provides a component of the aforementioned kind in which the coating of a relatively soft material is reliably held by the base body without become detached or distorted. The component in accordance with the invention has a base body of a relatively hard material and a coating of a relatively soft material coating the main surface area of the base body. The base body has a support structure extending from the periphery and being angled with respect to said main surface area, the coating preferably-extends on at least part of the support structure. The corresponding edge portion of the coating comprises a reinforcement made of a relatively hard material and engaging the base body preferably positively but with which it may also be screwed. Due to the reinforcement provided in the edge portion a rugged structure is available, permitting a secure fixation to the base body. In the preferred embodiment the reinforcement is latched in place with the base body. Such a connection is particularly expedient when usual fabrication methods such as injection molding several plastics components fail to permit achieving a solid composite between base body and coating.

In one preferred embodiment the coating is further held by the reinforcement in a tensioned condition on the base body, as a result of which a smooth coating surface is assured.

BRIEF DESCRIPTION OF THE DRAWINGS

Further features and advantages of the invention read from the following description of an example embodiment with reference to the attached drawing in which:

The Single FIGURE is a section view through an embodiment of the component in accordance with the invention.

DETAILED DESCRIPTION OF THE INVENTION

Referring now to the sole FIGURE there is illustrated the component in the form of a key cap for actuating an electric switch, more particularly for a multifunctional steering wheel.

The component comprises a cap-shaped base body 10 of a relatively hard plastics material and a coating 12 of a relatively soft rubber-like material. The base body 10 has a main surface area and angled side edge portions. The coating 12 covers the main surface area of the 10 and is continued over the edge portion thereof. Embedded in the corresponding edge portion of the coating 12 is a reinforcement in the form of a stiffening ring 14 of a relatively rigid material. Molded to the base body 10 is at least one latching key 10a clasped by one latching edge of the stiffening ring 14. Further molded on the stiffening ring 14 is a latching key 14a clasped by a latching edge of the base body 10. Due to the latching connection between the base body 10 and the coating 12 a reliably connection between the parts is assured even without the materials of the base body and coating forming a composite. Preferably the coating 12 is maintained in a tensioned condition on the base body 10 by the latching connection so that the coating 12 always presents a smooth surface to the user. Due to the tensioned condition of the coating 12 on the base body 10 manufacturing tolerances and fluctuations due to temperature are also compensated.

What is claimed is:

1. A component comprising:
   a base body having a main surface area facing in a first direction and side edge portions which extend from and are angled with respect to said main surface area, said base body being made of a plastic material; and
   a coating member covering said main surface area of said base body, said coating member having an edge portion covering at least parts of said angled side edge portions of said base body,
   said coating member being made of rubber which is softer than said plastic material of which said base body is made,
   said edge portion of said coating member comprising a reinforcement member secured to the coating and which mechanically reinforces said coating, said reinforcement member being made of a material which is harder than the material of which said coating member is made, and
   said reinforcement member engaging a surface of said base body facing in a second direction opposite said first direction, said coating member being thereby mechanically secured to said base body by the reinforcement member.

2. A component comprising:
   a base body having a main surface area and side edge portions which are angled with respect to said main surface area, said base body being made of a plastic material; and
   a coating member covering said main surface area of said base body, said coating member having an edge portion covering at least parts of said angled side edge portions of said base body,
   said coating member being made of rubber which is softer than said plastic material of which said base body is made,
   said edge portion of said coating member comprising a reinforcement member which is made of a material which is harder than the material of which said coating member is made, and
   said reinforcement member engaging said base body, said coating member being thereby mechanically secured to said base body,
   said base body having a latching key projecting from said side edge portions of said base body, said latching key being angled with respect to said main surface area of said base body.

3. The component as set forth in claim 2 wherein said coating member extends across at least part of said latching key.

4. The component as set forth in claim 2 wherein said reinforcement member is formed by a stiffening ring embedded in said edge portion of said coating member.

5. A component comprising:
a base body having a main surface area and side edge portions which are angled with respect to said main surface area, said base body being made of a plastic material; and
a coating member covering said main surface area of said base body, said coating member having an edge portion covering at least parts of said angled side edge portions of said base body,
said coating member being made of rubber which is softer than said plastic material of which said base body is made,
said edge portion of said coating member comprising a reinforcement member which is made of a material which is harder than the material of which said coating member is made, and
said reinforcement member engaging said base body, said coating member being thereby mechanically secured to said base body, said reinforcement member being latched to said base body.

6. A component comprising:
a base body having a main surface area and side edge portions which are angled with respect to said main surface area, said base body being made of a plastic material; and
a coating member covering said main surface area of said base body, said coating member having an edge portion covering at least parts of said angled side edge portions of said base body,
said coating member being made of rubber which is softer than said plastic material of which said base body is made,
said edge portion of said coating member comprising a reinforcement member which is made of a material which is harder than the material of which said coating member is made, and
said reinforcement member engaging said base body, said coating member being thereby mechanically secured to said base body
said base body having a latching key that cooperates with a corresponding latching edge of said reinforcement member.

7. A component comprising:
a base body having a main surface area and side edge portions which are angled with respect to said main surface area, said base body being made of a plastic material; and
a coating member covering said main surface area of said base body, said coating member having an edge portion covering at least parts of said angled side edge portions of said base body,
said coating member being made of rubber which is softer than said plastic material of which said base body is made,
said edge portion of said coating member comprising a reinforcement member which is made of a material which is harder than the material of which said coating member is made, and
said reinforcement member engaging said base body, said coating member being thereby mechanically secured to said base body,
said base body having a latching edge that cooperates with a corresponding latching key of said reinforcement member.

8. A component comprising:
a base body having a main surface area and side edge portions which are angled with respect to said main surface area, said base body being made of a plastic material; and
a coating member covering said main surface area of said base body, said coating member having an edge portion covering at least parts of said angled side edge portions of said base body,
said coating member being made of rubber which is softer than said plastic material of which said base body is made,
said edge portion of said coating member comprising a reinforcement member which is made of a material which is harder than the material of which said coating member is made, and
said reinforcement member engaging said base body, said coating member being thereby mechanically secured to said base body,
said coating member being made of rubber.

9. A component comprising:
a base body having a main surface area and side edge portions which are angled with respect to said main surface area, said base body being made of a plastic material; and
a coating member covering said main surface area of said base body, said coating member having an edge portion covering at least parts of said angled side edge portions of said base body,
said coating member being made of rubber which is softer than said plastic material of which said base body is made,
said edge portion of said coating member comprising a reinforcement member which is made of a material which is harder than the material of which said coating member is made, and
said reinforcement member engaging said base body, said coating member being thereby mechanically secured to said base body,
said coating member being maintained in a tensioned condition on said base body by said reinforcement member.

10. A component comprising:
a base body having a main surface area and side edge portions which are angled with respect to said main surface area, said base body being made of a plastic material; and
a coating member covering said main surface area of said base body, said coating member having an edge portion covering at least parts of said angled side edge portions of said base body,
said coating member being made of rubber which is softer than said plastic material of which said base body is made,
said edge portion of said coating member comprising a reinforcement member which is made of a material which is harder than the material of which said coating member is made, and
said reinforcement member engaging said base body, said coating member being thereby mechanically secured to said base body,
said main surface area of said base body providing a surface for mechanically actuating an electric switch component.

* * * * *